United States Patent [19]

Logan et al.

[11] Patent Number: 5,802,299

[45] Date of Patent: Sep. 1, 1998

[54] INTERACTIVE SYSTEM FOR AUTHORING HYPERTEXT DOCUMENT COLLECTIONS

[75] Inventors: James Logan, Methuen; Derek V. Carroll, Boxford; Charles G. Call, Hingham, all of Mass.

[73] Assignee: Microtouch Systems, Inc., Methuen, Mass.

[21] Appl. No.: 600,911

[22] Filed: Feb. 13, 1996

[51] Int. Cl.⁶ .................... G06F 15/173; G06F 13/14; G06F 13/38

[52] U.S. Cl. ............... 395/200.48; 395/200.76; 707/501; 707/513

[58] Field of Search ................... 395/200.76, 762, 395/774, 200.47, 200.48, 200.49, 200.53, 200.54, 200.55, 200.56

[56] References Cited

U.S. PATENT DOCUMENTS

| | | | |
|---|---|---|---|
| 5,204,947 | 4/1993 | Bernstein et al. | 395/774 |
| 5,297,249 | 3/1994 | Bernstein et al. | 395/774 |
| 5,572,643 | 11/1996 | Judson | 395/672 |

OTHER PUBLICATIONS

Cyber patrol software documentation, Microsystems Software, Framingham, Massachusetts, Jul. 31, 1995.
Cyber sitter software documentation, Solid Oak Software, Inc., Santa Barbara, California, Jun. 26, 1995.

*Primary Examiner*—Frank J. Asta
*Assistant Examiner*—D. Scott Juneau
*Attorney, Agent, or Firm*—Banner & Witcoff, Ltd.

[57] ABSTRACT

A network based hypertext display system employing a supervisory computer interconnected with one or more information display units and one or more remote document servers via a network, such as the Internet. The supervisory computer controls the content displayed by the display units by transferring to each unit a control information file as well as hypertext document files which are locally stored in the display units. The control file determines the extent to which the display unit can access remotely stored information and provides additional information which is used to alter the presentation to the user. Stored control information is used to rewrite hypertext document such that certain links are disabled, and to suppress the appearance of visual cues associated with the displayed anchor which identifies selected links in the referencing document. Links and other information in local and remotely accessed documents are rewritten in accordance with commands created by a content developer using an interactive content authoring system. Means are employed for controlling the duration of a given user session in response to the material selected for display, the time of day, and user demographics. Locally stored data copied from original documents stored on remote servers is periodically validated and updated when the validation indicates that the original has been modified.

28 Claims, 9 Drawing Sheets

INTERACTIVE SYSTEM FOR AUTHORING HYPERTEXT DOCUMENT COLLECTIONS

FIELD OF THE INVENTION

This invention relates to electronic information display systems and more particularly to a system for interactively assembling, authoring and defining the content of a controlled access hypertext display system.

BACKGROUND OF THE INVENTION

Kiosks equipped with touchscreens have proven to be a highly effective means for conveying usefull information to the public. In retail stores, for example, kiosks can provide directory information to help customers find needed products while promoting featured items. Placed in corporate lobbies, showrooms or trade show booths, the kiosk can be an effective sales tool, allowing the user to select text and graphical information of particular interest. In malls, airport lobbies, community information centers, and other public areas, the kiosk can effectively answer questions, guide visitors to desired locations, and publicize the products and services offered by the kiosk's sponsors.

Because kiosks can be readily implemented with inexpensive personal computers and touchscreen monitors, the principal cost of a typical kiosk-based information system is incurred in designing and implementing the software which generates the desired interactive displays. This expense typically grows as the displays are continually altered to reflect new information.

Interactive displays which are closely similar in style and content to those needed for kiosk systems are now being created in large quantities by businesses seeking the exposure offered by the World Wide Web, the Internet system of interlinked hypertext documents. Businesses, institutions and individuals are presenting a rapidly increasing volume of promotional, tutorial, entertainment, and reference information on interactive "web pages made" and available to any computer having standard web browsing software and an Internet service connection.

Although the interactively displayed information suitable for presentation by a kiosk is closely similar in content and style to the information provided by World Wide Web servers, the objectives of the two systems are normally quite different. While the web user desires and obtains unlimited access to the immense amount of generally available information, the kiosk owner typically wishes to focus the user's attention on particular promotional material or information. Moreover, while the web user may wish to browse indefinitely through hypertext links which appear to be of interest, the kiosk owner frequently needs to limit the session time during which a particular user operates the kiosk in order to free the system for use by others.

SUMMARY OF THE INVENTION

It is an object of the present invention to facilitate the assembly, definition and organization of a displayable collection of hypertext documents, preferably including documents which are accessible from remote sources via a network such as the WorldWide Web, and to simplify the creation of information structures which control the form, content and accessibility of the documents within the collection.

The preferred embodiment of the invention takes the form of an interactive hypertext document browsing and content authoring system which displays hypertext documents and accepts content control information from a content developer, enabling the creation of display systems based on available hypertext documents without requiring programming in textual languages.

In accordance with a principal feature of the invention, means are employed for accepting from the developer link control information which may be used to alter selected links on a given hypertext document to prevent access to linked external information specified by a pre-existing link or to substitute a specification of different linked external information. To help insure that all links to unauthorized information are disabled, document scanning means may be employed to automatically locate all links on each authorized document page and present to the content developer a request for link control information which will govern the operation of each detected link. Means are provided which enable the content developer to specify, for any given target document, whether links to that target document are to be prevented everywhere they occur in any referencing document, or only where that link appears in a specific location. In addition, facilities are provided to enable the developer to specify, for any given target document, whether all further links from that document is to be prevented, eliminating the need to specify the treatment of links from the target on a link-by-link basis.

In accordance with the invention, means are provided for accepting from the developer an indication that additional information should be displayed prior to the display of a given target document, and for specifying that such additional information should be selected from a collection of available information, or for identifying the additional information with particularity. Means are further advantageously provided which enable the developer to specify the duration of the display of such additional information during the transition to the target page.

To provide an additional mechanism for supplement existing information of pre-existing hypertext documents, means are provided which allow the developer to specify a predetermined location in an existing document, or predetermined detectable information in an existing document, and to insert additional information at the predetermined location or to supplement or replace the detectable information with a supplemental display. In addition, means are provided for defining additional links, and the anchor text associated with such links, and adding those links to pre-existing documents.

These and other objects and features of the invention will become more apparent through a consideration of the following detailed description of a preferred embodiment of the invention. In the course of this description, frequent reference will be made to the attached drawings.

DESCRIPTION OF THE PREFERRED EMBODIMENT

System Overview

Figure 1:
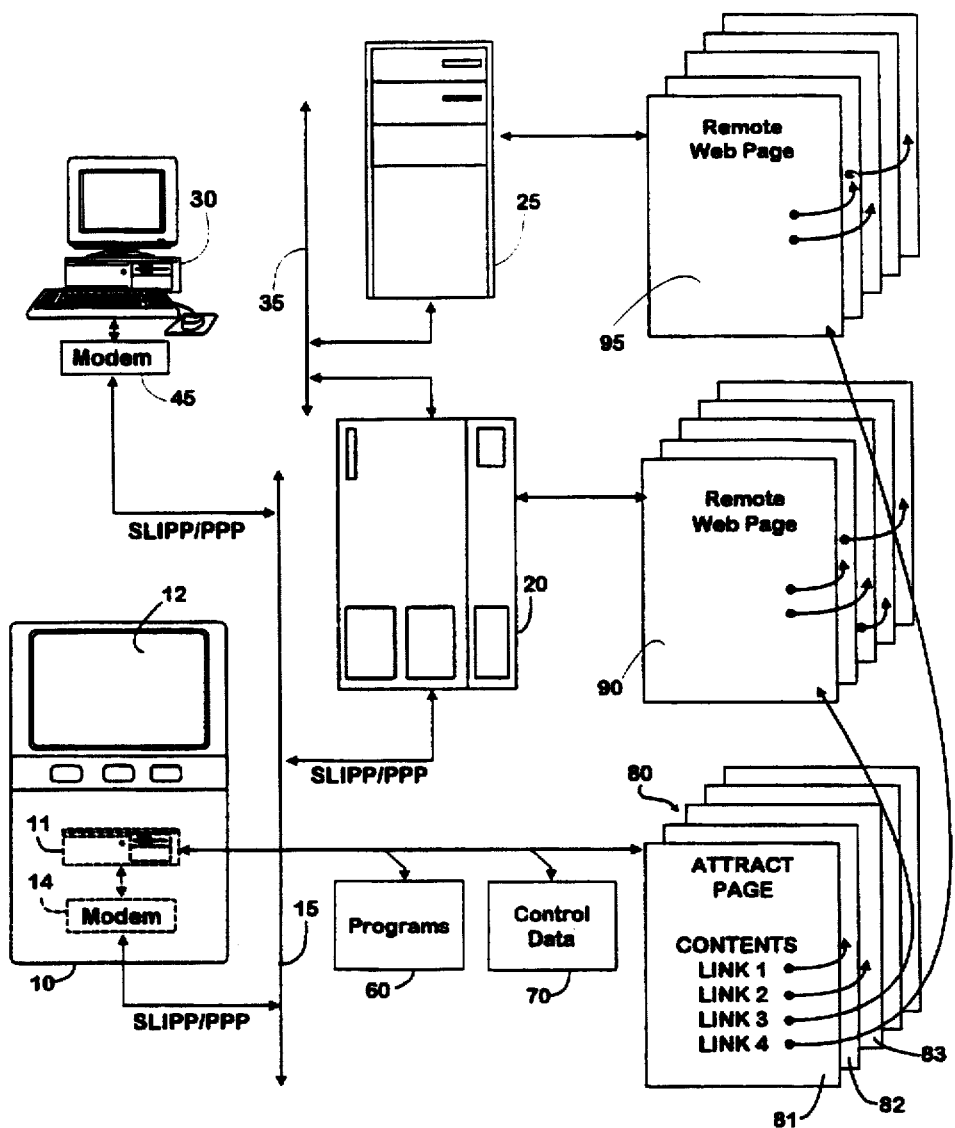
FIG. 1 is a illustration of the principal components used to implement a programmable, interactive HTML display kiosk system embodying the invention.

As seen in FIG. 1, an interactive computer display kiosk 10 which implements the invention consists of a kiosk cabinet within which a personal computer 11 and a touch-screen monitor 12 are mounted. The personal computer 11 is connected via a modem 14 and dial-up or leased telephone lines 15 to a remotely located computer 20 which provides a conventional serial data SLIPP or PPP modem link to the Internet service. The remote computer 20 also operates as a World Wide Web server and is connected via high speed Internet TCP/IP Internet network lines 35 to other computers on the Internet, such as the second web server computer seen at 25. The servers 20 and 25 provide access to stored information to connected client computers such as the kiosk 10 and a personal computer 30 which is also connected via a modem SLIPP/PPP connection over the telephone lines 15 to computer 20. The modem 14 provides data communications via the telephone SLIPP/PPP lines 15 while a modem 45 similarly provides data communications for the personal computer 30.

The personal computer 11 includes its own local magnetic disk drive for persistent mass storage. The computer 30 may be used as an authoring site at which the content accessible by the kiosk computer 11 is defined and from which displayable data and control information may be transferred to the kiosk computer 11. A conventional modem-to-modem connection may be established between the modem 14 attached to kiosk computer 11 and the modem 45 attached to the remote personal computer 30 such that direct file transfers can be made between the computer 30 and the kiosk 10 using a conventional dial-up modem connection via the telephone lines 15. To permit such transfers, the kiosk personal computer 11 may be programmed to place the modem 14 in auto-answer mode when the kiosk 10 is not being used as a web client, enabling the computer 30 to use its modem 45 to directly dial the modem 45 to establish a file transfer connection for storing or modifying programs and data stored at the kiosk 10. Alternatively, file transfers between the authoring computer 30 and the kiosk computer 11 may be accomplished over the SLIPP/PPP Internet connection using HTTP or FTP file transfers.

As discussed later, computer 11 in kiosk 10 stores hypertext browsing and control programs as indicated at 60, one or more files of access control data as indicated at 70, and locally stored hypertext documents indicated generally at 80 which are displayed on the touchscreen 12 in the kiosk 10. The programs 60, control data files 70, and the displayable hypertext data 80 may be periodically updated from time to time by transferring information from the authoring computer 30 to the kiosk computer 11.

The kiosk programs 60 include conventional web page browsing software such as: the NCSA Mosaic browser available from the National Center for Supercomputing Applications (Software Development Group), Champaign, Ill.; Spyglass Mosaic offered by Spyglass, Inc, Naperville, Ill.; Netscape Navigator marketed by Netscape Communications Corp., Mountain View, Calif.; and Internet Explorer offered by Microsoft Corporation, Redmond, Wash. In general, these web browsers retrieve and display hypertext documents (web pages) written in standard Hypertext Markup Language (HTML).

HTML documents take the form of conventional ASCII text files which include imbedded tags which format the text for display presentation and provide links to graphics files containing images which may be imbedded in the documents, as well as links to other web pages to which hypertext jumps may be made. Linked files and documents are identified within the imbedded tags in a predetermined Uniform Record Locator (URL) format which includes the identification of the communications protocol used (including conventional and secure hypertext protocols respectively, File Transfer Protocol or FTP, etc.), the identification of a particular server computer which stores the referenced file, and the directory and file name of the file itself on the designated server. Hypertext documents and linked files which are stored locally in mass storage and directly accessible by the running browser program may also be designated by a URL and interactively displayed in the same way that the browser displays web pages available from remote servers through the Internet. Extensive information describing HTML, the World Wide Web, and the Hypertext Transport Protocol/Internet Protocol is available in the published literature. See, for example, *World Wide Web Bible* by Bryan Pfaffenberger, MIS:Press, ISBN 1-55828-410-9 (1995); *Netscape and HTML Explorer* by Urban A. LeJeune, Coriolis Group, ISBN 1-883577-57-1 (1995); and *Programming WinSock* by Arthur Dumas, Sams, ISBN 0-672-30594-1 (1994) which describes the WinSock Library, one of several Windows Open Services Architecture (WOSA) standards being used to add TCP/IP connectivity to applications.

As seen in the illustration of FIG. 1, the hypertext documents stored locally on the hard disk of the kiosk computer 11 preferably includes an attract page 81 which, as illustrated, might contains imbedded hypertext links LINK1

AND LINK2 to other locally stored pages 82 and 83 respectively, as well as LINK3 to a home page 90 stored by the web server computer 20, and LINK4 to a further web page 95 stored on the web server computer 25. By touching the touchscreen 12 at the position where highlighted text, or a graphic, which visually represents the linked subject matter appears, the kiosk user can request the display of the linked information, which itself typically contains links to other web pages, and so on.

Using the principles of the invention, the kiosk proprietor may limit the kiosk user's access to authorized pages only. These constraints are provided by access control programs included in the set of programs 60 stored on the hard drive of the kiosk computer 11 which are responsive to information stored in the control data files 70 also stored in computer 11. The access control programs analyze and rewrite the text found in accessed HTML pages before those pages are displayed and perform predetermined functions defined by stored access control information when the user activates selected links.

The access control information itself may be conveniently created using the remote authoring computer 30 by browsing a combination of locally stored hypertext documents and remote web pages while responding appropriately to requests for access control information which is generated during an interactive development session. After the control information and the locally stored hypertext documents are created at the authoring computer 30, both may be uploaded to one or more kiosk computers, such as kiosk computer 11, using a conventional modem dialup file transfer or transfers over the Internet as noted above.

The local storage of displayable information supplements and should be distinguished from the caching operations performed by conventional web browsing and proxy server software. Such caching systems typically store copies of information accessed over the Internet in local disk storage until a cache size limit is reached, and then continue to save additional data by overwriting the least recently accessed data. Because a given item of data may be altered at anytime at its origin, these caching schemes typically retrieve data from the cache only after the originating server verifies that the desired data has not been modified since it was originally placed in the local cache. For example, the Netscape Proxy Server marketed by Netscape Communications Corp., Mountain View, Calif. combines the ability to cache data accessed from the network using "if modified since" checking with a high-level access control to prohibit access to documents having a specified URL for all or specified hosts.

In accordance with the present invention, such a caching mechanism is not required and not burdened with information which the authoring computer 30 designates for storage as the original copy, and no access to an originating server is required. The performance of the display unit, such as the kiosk computer 11, is accordingly enhanced by storing a significant portion of the content locally and only requiring a slower network access to be performed for displayed information of the following kinds:

(1) information which changes so frequently that the transmission of updates under the control of the authoring computer would be inefficient, for example: weather data from a news source which includes weather map data which is updated every few minutes;

(2) information which occupies a significant amount of space and/or contains items which are individually accessed only infrequently, for example: individual topics in an online encyclopedia which, because of imbedded graphics and the like, would be time-consuming to transfer and which would consume a large amount of local storage capacity.

To the extent that information is accessed by the display unit from the network, it may be cached in the usual way to eliminate the need to access information which has not been altered by the originating server since the last cache storage was performed.

In the description to follow, attention will first be directed to the operation of the access control mechanism, including the browser, the access control programs, and the stored access control data, as the kiosk user interactively operates the browser. Attention will then be directed to the mechanism for interactively creating those access control data structures which limit and control the user's access to information.

Figure 2:
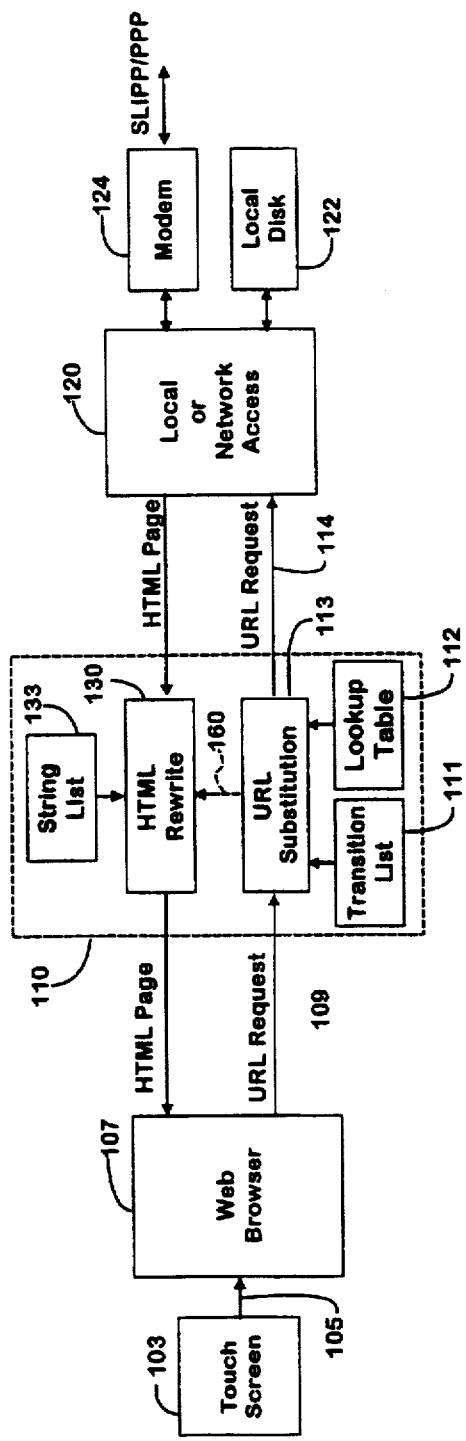
FIG. 2 is a block diagram of the principal components of a controlled access HTML display system employed to implement an embodiment of the kiosk unit employing the invention.

Access Control Mechanism The operation of the user access control mechanism is illustrated generally in FIG. 2 of the drawings. Actions are initiated when the kiosk user touches a displayed link anchor on the kiosk touchscreen as depicted at 103 in FIG. 2. The resulting touchscreen signal 105 is processed by the executing web browser program 107 which responds by issuing a request 109 for the retrieval of displayable data identified by a particular URL.

Figure 13:
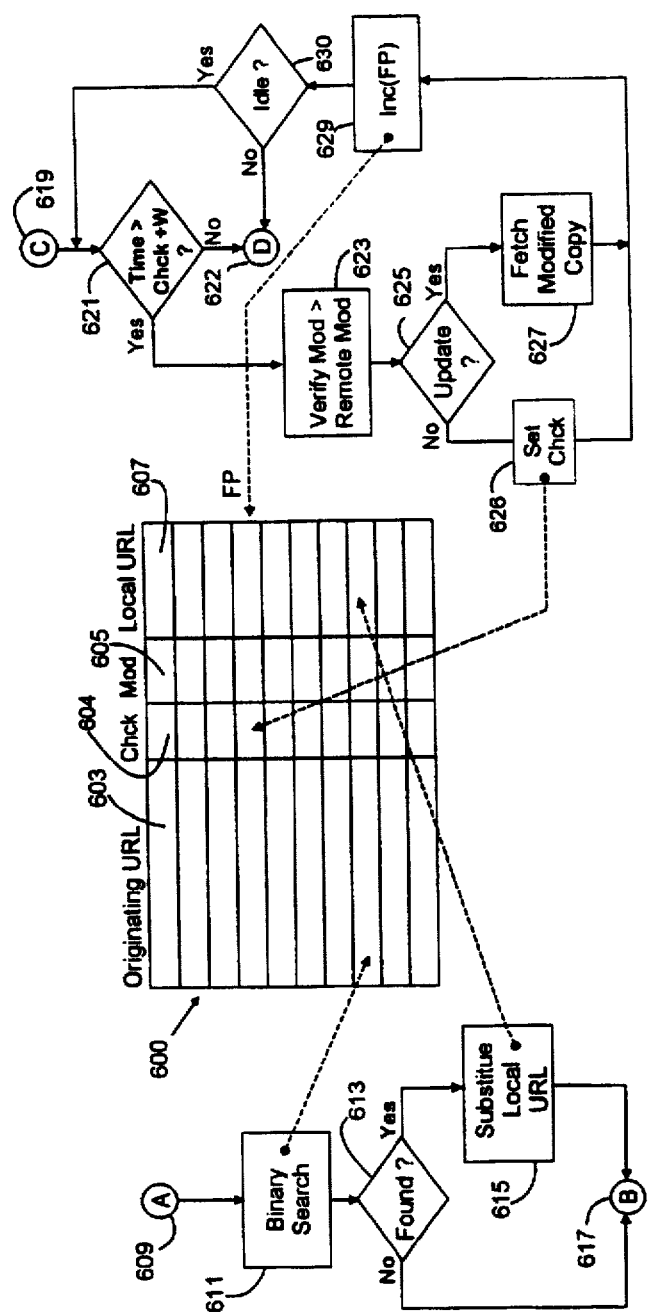
FIG. 13 is a flow chart which describes the manner in which the lookup table which relates local storage URL's to the original remote URL of the stored document is used to translate URL requests and to update the stored files periodically to match the originating files.

The request 109 is processed by an access control mechanism indicated generally at 110 which includes a mechanism 113 for comparing the URL in request 109 with URLs in transition list 111. If the requested URL specified in request 109 is found in the list 111, a transition display page is sent to the web browser 107 while the originally requested URL is concurrently sent to the access mechanism 120. This transition display mechanism 113, described in more detail later in connection with FIG. 13, provides a mechanism for displaying one or more display pages to the user before the information identified by the requested URL is displayed.

The access mechanism 120, like the web browser program 107, is conventional. URL's which translate into local disk addresses, such as:

"file:C:\WINDOWS\Desktop\HTML\HOME.HTM"

are accessed directly from local storage, whereas URL's which identify information stored on remote servers, such as:

"http://www.micotouch.com/products/rj234.html/"

are retrieved by the kiosk computer utilizing TCP/IP software, such as the dynamic link library WINSOCK.DLL for Windows 3.1 or WSOCK32.DLL supplied by Microsoft with Windows 95. Depending on the content of the URL in the request 114, the linked data specified by the URL Request 114 is obtained either from the kiosk's local storage system, illustrated by local disk 122 in FIG. 2, or by transmitting an http/ip Internet message requesting the information via a modem 124 and SLIP/PPP connection 126 to the remote Internet web server (not shown) which holds the requested information. If the access request is successfully satisfied, the access mechanism 120 returns the requested data in the form of an HTML document, graphical image, FTP file, or other displayable data identified by the URL in the request 114; otherwise, the access mechanism returns an appropriate error message which is displayed to indicate to the kiosk user that the access did not succeed.

Rewriting Incoming HTML Pages

When the returned displayable data is an HTML document, the text of that document is processed by the access control mechanism 110 which includes a mechanism 130 for rewriting the HTML page in accordance with information in a string list data structure 133. The string list 133 typically contains a collection of text replacement request commands each including of a designated target string and a designated replacement string. Whenever one of the target strings in the structure 133 is found within the text of an incoming HTML document, that target string is replaced by the associated replacement string before the incoming HTML document is displayed by the web browser program 107.

The HTML text replacement function performed at 130 in the access control mechanism 110 may be used to provide a number or useful functions. In addition to rewriting displayable text, the rewriting mechanism 130 may add new links to additional information which the kiosk owner may wish to communicate to the kiosk user, may delete links to information which should be hidden to the user, or may substitute replacement links. Unlike the URL transition display generating mechanism 113, which is capable of inserting one or more display pages before a page designated by the URL request 109, the mechanism 130 may be used to substitute a different target page for the page specified by a link imbedded in an incoming HTML document, and may also be used to eliminate the highlighting of, or rewrite, the displayed anchor text which is associated with the linked URL in the HTML page. The string list 133 includes a collection of target+replacement string pairs. The mechanism 130 searches the HTML page fetched by the access mechanism 120, searching for a match to each of the target strings, and when found substitutes the replacement string for the target string.

More specifically, each command stored in the string list 133 takes the form expressed by the following Pascal record definition:

```
Replacement_Command = record
    Target_Page, Target, Replacement: pchar;
    Location: Longint;
    Flag: word
End;
```

The Target_Page, Target and Replacement fields each hold pointers to null-terminated strings (character arrays). The Location field is 32-bit integer which holds the position at which the replacement string is to be inserted (when Target is a null pointer). The Flag field holds boolean flag bits having the following significance when true:

Search_Normal: Search for Target string in normal (non-anchor) displayable text;

Search_Anchor: Search for Target string in displayable anchor text;

Search_URL: Search for Target string in URL definition within anchor tags;

Case_Sensitive: Apply case sensitivity to search for Target;

Disable_Pagewide: Disable all links on Target_Page;

The versatility of the text replacement mechanism 130 is illustrated by the following example replacement commands. For each example, assume that an incoming hypertext document received at the HTML rewrite mechanism 130 from the access mechanism 120 includes an imbedded "anchor tag" reading:

<A HREF="http://www.main.com/netspot/toc.html">Table of Contents<\A>

Such a tag would be displayed by the browser as the highlighted anchor text "Table of Contents" which, when touched by the kiosk user, would result in a generated request to retrieve and display the HTML document file designated by the Uniform Record Locator (URL):

"http://www.main.com/Internet/toc.html".

This URL identifies a file named "toc.html" in the "netspot" directory of the web server computer named "mentum" which is available over the Internet using the hypertext transport protocol as indicated by the prefix "http".

EXAMPLE 1

If the string list 133 contains the following Target and Replacement fields:

Target "http://www.main.com/netspot/toc.html"

Replacement: "file:c//newdir/newtoc.htm"

where the replacement string is a new URL specifying a file named "toc.htm" on the kiosk computer's disk storage directory "newdir", the effect would be to change the anchor tag in the HTML text such that the anchor text "Table of Contents" is unchanged and continues to be highlighted but, when touched, the locally stored file newtoc.htm would be retrieved by the access unit 120 and displayed instead of the file on the remote server originally specified.

EXAMPLE 2

Target: <A HREF="http://www.main.com/netspot/toc.html">Table of Contents<\A>

Replacement: "Table of Contents"

This replacement command removes the associated link and the highlighting from the displayed text "Table of Contents".

EXAMPLE 3

Target: "Patent Office"

Replacement: "<A HREF="http:/www.uspto.gov/">Patent Office<\A>"

This command rewrites each occurrence of the string "Patent Office" such that web browser 107 highlights the string as being an anchor text and provides a link to a publicly available home page maintained by the U.S. Patent Office whenever the anchor text is touched by the kiosk user.

EXAMPLE 4

Target_Page: http://w.ajax.com/sale.html/

Target: "<Head>

Replacement: "<Head><META HTTP-EQUIV= REFRESH CONTENT="12; URL= file:c:\newdir\resale.htm">

This example, unlike the first three, limits the operation of the command to a designated target page and causes a <META...> element to be inserted in the document header. A Meta element is a standard HTML 3.0 element for simulating HTTP response headers in HTML documents which, in the example above, operates as a "client pull" dynamic HTML document loader. As a consequence, the inserted Meta tag causes the target page to be displayed for 12 seconds, at which time the browser automatically issues a URL request to replace the displayed target page with a page on the local hard drive specified by the content field of the inserted Meta tag.

EXAMPLE 5

Target_Page: http://www.ajax.com/sale.html/

Location: 1243

Replacement: "<IMG SRC="logo.jpg" ALIGN= BOTTOM>"

This command places the replacement string at character position 1243 in the HTML document designated by the URL given in the target page field of the command. The effect in this case is the insertion into the page of a graphical JPEG image designated by the relative source file designation "logojpg" in the replacement string. Note that the target location value identifies a position in the original incoming HTML page, before replacement commands have been employed to rewrite the text.

EXAMPLE 6

Target_Page: http://www.quigley.hotlinks.html/
Flags: Disable_Pagewide=true;
This command is created when all links from Target_Page are to be automatically disabled by replacing all link tags with replacement text which consists of the anchor information only.

Adding Insertion Pages

The transition control list 111 seen in FIG. 2 also consists of a series of structured records each of which takes the form expressed by the following Pascal record definition:

```
Transition_Command = record
    Trailing, Leading: pchar;
    Showtime: integer;
End;
```

The Trailing and Leading fields contain pointers to null-terminated strings which contain the URL's of the trailing and leading pages of page transition, respectively. The transition display mechanism 113 seen in FIG. 2 searches the transition control list to determine if the received URL request 109 contains a URL which matches a trailing URL on the list 111. If so, the page identified by the URL in the Leading field of the transition command is displayed first, and the duration of this display is specified the value contained in the Showtime field.

Figure 3:
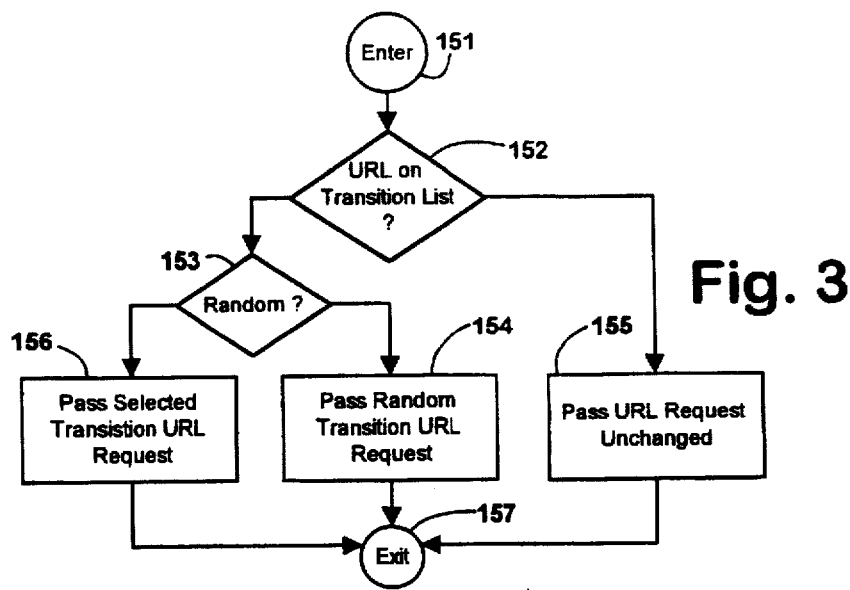
FIG. 3 is a flow chart illustrating the operation of the transition display mechanism used in the kiosk unit.

The operation of the transition display mechanism 113 is illustrated in more detail by the flowchart presented in FIG. 3. The transition control routine is executed by the kiosk computer during an interactive user session each time the user touches the kiosk touchscreen to cause the browsing program to generate a hypertext link request seen in FIG. 2 as URL request 109. When the transition display mechanism 113 receives that request, the routine shown in FIG. 3 is executed beginning at the entry point 151.

At 152, the transition list seen at 111 in FIG. 2 is searched. If the URL in the received URL request is found in the Trailing field of a transition command record, that record is tested at 152 to determine whether the Leading field contains a null pointer.

If no leading URL is specified, the routine selects a display page from a collection of available pages as seen at 154. This selection may be made randomly from a collection of pages placed in a predetermined directory on the kiosk computer's local hard drive (seen at 122 in FIG. 2), or by cycling through a list of insertable display page URLs. If the Leading field of the transition command contains a specific URL, that URL is included at 156 in the outgoing URL http request seen at 114 in FIG. 2.

Whether quasi-randomly selected at 154 or specifically identified as indicated at 156, the value indicating that the requested URL identifies an insertion page, and a pointer to the satisfied transition command in list 111, are passed to the HTML rewrite routine 130 as indicated at 160 in FIG. 2. The insertion page retrieved by the access mechanism 120 is then rewritten (as illustrated by Example 4 above to place a client pull <META> element in the header of the leading page which identifies the trailing page URL and the desired display duration (Showtime) in the inserted <META> element.

Alternatively, a server-push mechanism may be used to insert a sequence of one or more leading pages prior to the trailing page identified in the original link request. Using the server push mechanism, the browser 107 seen in FIG. 2 is supplied with the page sequence using the HTTP MIME protocol and the duration of each page is determined by the HTML rewrite mechanism 130 which maintains an open connection to the browser 107, enabling replacement pages to be sequentially placed on the display screen under control of the mechanism 130.

Current versions of the Netscape Navigator and Internet Explorer web browsing programs support dynamic document loading using both linked client pull <META> meta elements or a server pushed sequence of HTTP MIME-partitioned pages.

In normal operation, the HTML rewrite unit 130 need only operate on those HTML documents which are accessed from the network, since locally stored HTML documents may be stored in rewritten form. In one instance, however, locally stored HTML documents should also be modified dynamically. This occurs when an attempt to access a given document from a remote server fails because the document described in link contained in a locally stored document is no longer available from the remote server. In that case, to avoid encouraging the user to attempt to access a remote document that is no longer available, the outdated link tag in the locally stored document should be rewritten to display the anchor information only and eliminate the link as illustrated by the string list command of Example 2 described earlier. This automatic suppression of the display of visual cues in connection with links that are no longer operative is particularly advantageous when the display unit is used by inexperienced users who may be confused by error messages returned by the remote server when requested documents are no longer available.

Interactive Access Control Development

As noted earlier, the creation of the software content of an effective interactive kiosk display system is typically quite costly. The ability to utilize existing web pages and HTML browsing software can significantly reduce these costs, so long as suitable safeguards are incorporated to prevent the user from accessing undesired web pages and to affirmatively guide the user's attention to desired information. The creation of such an access control mechanism may also be made an interactive process which may be performed by kiosk proprietors with little or no training in either programming or HTML page creation.

Figure 5:
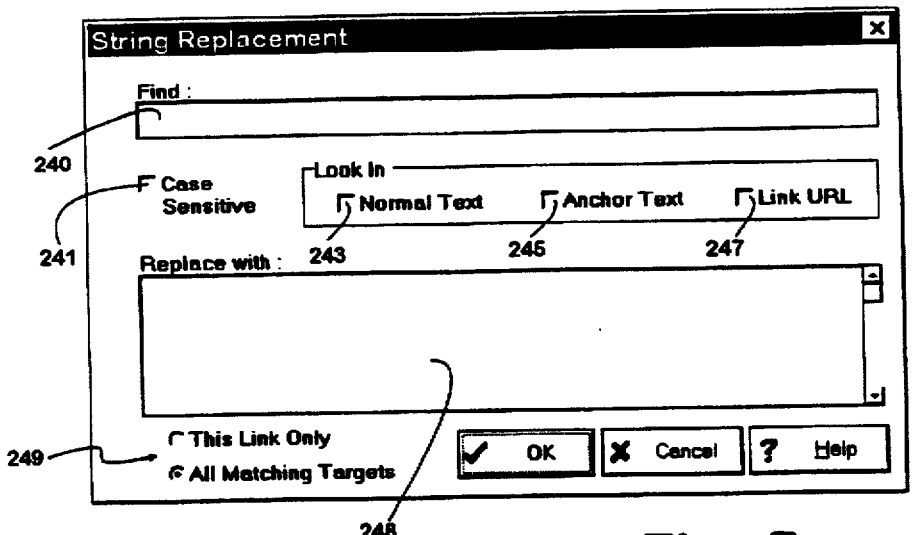
FIG. 5 shows the on-screen appearance of a dialog box used to obtain information defining the manner in which text information found in an HTML document is automatically rewritten to implement the invention.
Figure 6:
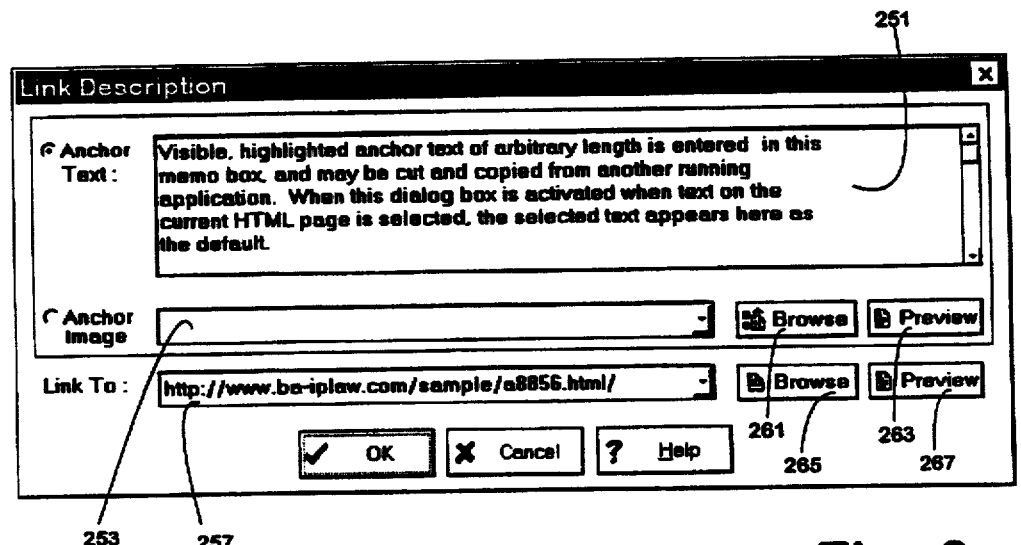
FIG. 6 illustrates the on-screen appearance of a dialog box employed to interactively obtain control information which defines or redefines links appearing in displayed hypertext documents.

From the kiosk owner's perspective, the development process merely requires that the HTML pages being made available to the user be browsed to activate links to other pages, supplying link control information when requested by the development program, and adding or editing links and text to the pages which are presented. An introductory explanation of the interactive development process is best illustrated by FIGS. 4–6 of the drawings, each of which illustrates the content of a dialog box presented to the developer during the course of a development session.

During the development session, the developer operates development software, to be discussed later, which operates as a conventional web browser. FIG. 4 shows a Link Handling dialog box which is displayed each time the developer activates a link imbedded in the currently displayed document to produce a URL request. The Link Handling dialog box contains a "Target" area for the entry of information specifying the handling of the linking function, and a "Transition Display" area for the entry of information specifying the manner in which insertion pages are to be displayed prior to the requested information.

Figure 4:
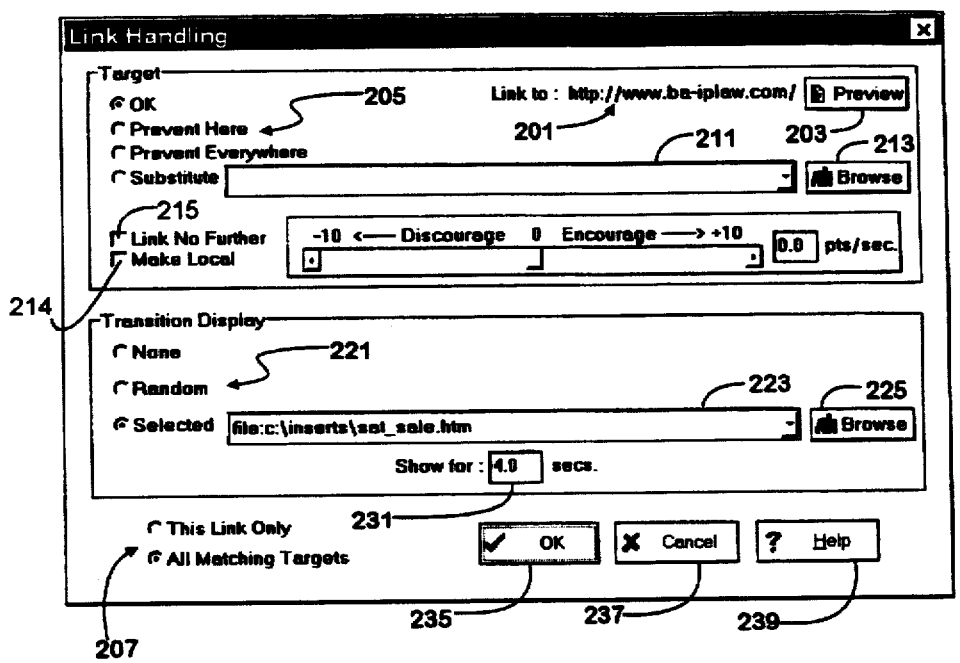
FIG. 4 depicts the on-screen appearance of a dialog box used to interactively obtain information for controlling the operation of hypertext links found in HTML pages.

In the "Target" area of the Link Handling dialog box seen in FIG. 4, the fully qualified URL of the HTML page to be displayed next is shown at 201 at the left of a preview button 203. By pressing the button 203, the developer may view (but not link from) the document identified by the URL displayed at 201. The developer may select among the options OK, Prevent and Substitute made available by the radio buttons 205.

If "Prevent" is selected using radio buttons 205, the remaining controls on the display are greyed to indicate they are disabled, with the exception of the preview button and the radio buttons at 207 which allow the developer to specify whether the choices made on the dialog box are to be applicable to all occurrences of links to this target URL, or only to the particular link whose activation caused the Link Handling dialog box to be displayed. The "Prevent" option is implemented by placing a replacement command record in the string list 133 which identifies the Target URL, sets the boolean values Search_URL to true, Search_Anchor to false, Search_Normal to false and Case_Sensitive to false. Target_Page and Replacement both contain null strings, unless radio buttons 207 are set to indicate that only this specific link is to be disabled, in which case Target_Page and Location are set to specify the page and character location respectively of the beginning of the link to be disabled.

If the radio buttons 205 are set to indicate that a different target should be substituted for the target whose URL is shown at 201, the "Substitute" button is selected which enables a drop-down edit box 211 and browse button 213. When the drop-down button at the right-hand end of drop-down edit box 211 is depressed, the URL's of the locally stored pages are displayed, enabling one files of those to be directly. Alternatively, the URL of a local or remote page may be entered into the edit box 211 or the browse button 213 depressed to display a conventional filename browsing dialog box for locating desired files anywhere on the local hard drive. When "Substitute" is selected, the originally requested URL display at 201 is greyed and the preview button 203 when pressed displays the substitute file whose URL is shown in the edit box 211. The substitution of a different link is implemented by placing a replacement record in the string list 133 which uses the Target and/or Location fields, as well as the Search_URL flag, to identify the link to be modified, and places the new target's URL in the replacement field. The replacement command of Example 1 described above may be generated by selecting the "Substitute" option in Link Handling dialog box of FIG. 4.

The handling of the target page identified at 201 may be further defined using the dialog box of FIG. 4 by the checking checkbox 215 labeled "Link No Further" to disable all of the links on the target page in the manner previously discussed in connection with the string replacement command Example 6.

The target area of the dialog box of FIG. 4 also includes a checkbox 214 which can be checked by the developer to indicate that a remote web page should be stored locally on the kiosk computer. In that event, a copy is made of the page identified by the URL displayed at 201, along with copies of all imbedded graphics identified by <IMG> tags. An entry is then made in a locally stored lookup table to which the access control unit 120 refers to convert link requests directed to the original remote URL into requests directed to the new locally stored file. No rewriting of the links themselves is required. As discussed later in conjunction with FIG. 9, HTML pages which are stored locally, including those which were locally stored at the request of the developer, may be rewritten in accordance with the stored string replacement commands on list 133 at the conclusion of the development session, eliminating the need for performing revisions during the browsing session. As previously discussed, remotely stored information which is subject to frequent or unpredictable change, such as weather reports, price lists, new services, etc., or which is quite voluminous and only infrequently accessed, should normally not be locally stored but instead remotely accessed. The checkbox 214 is disabled (checked and greyed) when the target page specified by the URL displayed at 201 is already locally stored.

The target area of FIG. 4 also includes controls 216–218 which enable the developer to assign a reward/penalty value to each target page. Each target page is initially assigned a neutral default reward/penalty value of zero, but may be assigned a value varying from a penalty of −10 to a maximum reward of +10. When a browsing session is initiated by the first link from the root attract page, the session-points-remaining value is set at a predetermined value determined by the user entries at 510 and 512 in the dialog box seen in FIG. 10, discussed later. As the session continues, the access control system 110 decrements this value by at the rate, for example, of 5 points per second for "neutral pages" but increases the rate to 15 points per second for heavily penalized pages, whereas pages set to a reward value of +5 result in no change, and reward values of +10 actually cause the session-points-remaining value to increase at the rate of 5 points per second. Whenever the accumulated points reaches zero the session is terminated by displaying an insert page reading "Your Time Has Expired. Next User Please", and returning to the attract page.

The scrollbar control 216 with the slider 217 provides a convenient mechanism for setting the reward/penalty value 218 as desired, indicating to the user that viewing certain pages is to be encouraged while viewing other pages is to be discouraged. In this way, users who are viewing pages which the kiosk proprietor favors earn longer session times that viewing disfavored pages.

When the developer actuates a link during the development session, the Link Handling dialog box seen in FIG. 4 also provides a mechanism for requesting and identifying the display of a transition page prior to the display of the target page specified in the target area as described above. The radio buttons allow the specify "None" to indicate that no page is to be displayed prior to the target page; "Random" to specify that an insert page is to be selected from the collection of available insert pages, and "Selected" to indicate that the particular page entered into drop down edit box 223 is to be inserted. The drop down button at the right of edit box 223 causes the display of a drop down list of all insert pages in the collection of available pages from which a selection may be made. Alternatively, a URL may be entered directly into the edit box 223 or selected using a conventional filename selection dialog box activated when the adjoining browse button 225 is pressed.

The duration of the inserted page may be set by entering a number in the edit box 231. This number is then placed in the <META> statement along with the insertion page name to control the dynamic loading of the original target URL page after the display of the insertion page as previously described in connection with FIG. 3.

The dialog box seen if FIG. 5 is displayed whenever the user performs a right-button mouse click when the cursor is on a word or when displayed text has been selected using a standard left-button-depressed text selection dragging operation. When a word or string is selected, depressing the right-hand mouse button produces a set of conventional options (Copy, Cut, etc.) and the additional option "Replace" which, when chosen, displays the dialog box seen in FIG. 5 with the selected word or text appearing as the default in the Find edit box 240. Using the check boxes at 241, 243, 245, and 247, the developer indicates whether or not the string displayed in edit box 240 is to be replaced on a case sensitive basis, and whether it is to be replaced when found in normal displayed text, anchor text or in a URL, respectively. The replacement text, which may be lengthy, is entered inot a memo box 248 as seen in FIG. 5. The radio buttons 249 allow the developer to specify whether all occurrences of the text in edit box 240 are to be rewritten as indicated by the dialog box, or only the specific text which was identified when the dialog box was opened. The dialog box seen in FIG. 5 can also be opened by menu selection, in which case the radio buttons 249 are greyed and disabled. The replacement command Example 2 discussed above may be produced using the String Replacement dialog box seen in FIG. 5.

By right-clicking the mouse on "white space" (e.g., a position between words or images) of the currently displayed page, a pop-up menu is produced which includes the entry "Insert Link" which, if chosen, displays the dialog box of FIG. 6. Alternatively, right clicking on existing anchor text or image causes the pop-up menu to include the option "Edit Link" which, if selected, causes the dialog box of FIG. 6 to be presented with the included controls already filled in; that is, if anchor text was selected, that text appears in the memo box 251 and if an anchor image was selected, the S.C.=URL for that image appears in a drop down edit box 253. Likewise, the URL of the target of the link is displayed in a drop down edit box 257.

Figure 8:
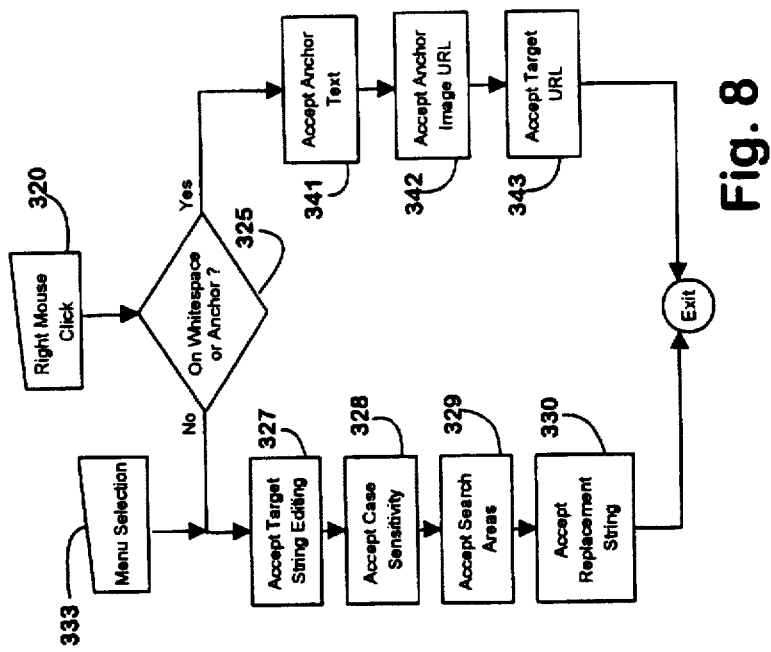
FIG. 8 is a flow chart which depicts a routine for utilizing information supplied by means of the dialog boxes of FIGS. 5 and 6.
Figure 7:
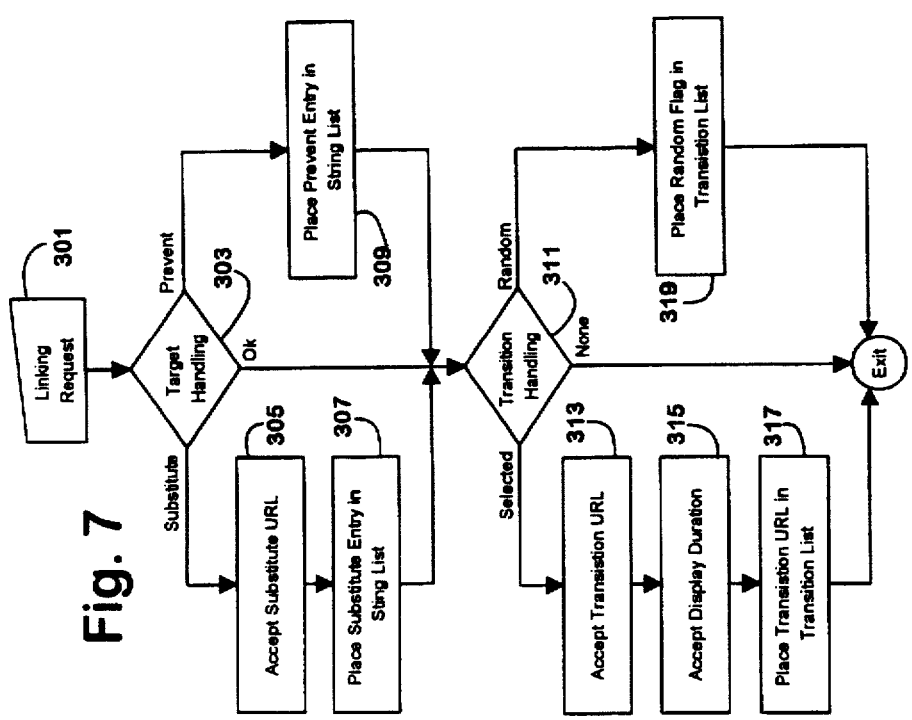
FIG. 7 is a flow chart which illustrates the manner in which information supplied by the dialog box of FIG. 4 is utilized by the invention.

The data gathering functions provided by the dialog boxes seen in FIGS. 4–6 of the drawings is further illustrated by the flow charts seen in FIGS. 7 and 8.

FIG. 7 illustrates the operation of the dialog box of FIG. 4. The dialog box is displayed in response to the issuance of a linking request by the development system web browser as seen at 301 in FIG. 7. The radio buttons 205 of FIG. 4 accept a selection within the decision box 303 in FIG. 7. If a substitution is selected, the developer supplies the URL of the new target at 305 using the edit box 211 seen in FIG. 4. Appropriate entries are then made into the string list seen at 133 in FIG. 2 as seen at 305, 307 and 309 in FIG. 7.

The lower portion of the flow chart seen in FIG. 7 illustrates the procedure followed to utilize the entries in the transition display section of the dialog box seen in FIG. 4. The decision block 311 of FIG. 7 accepts the selection made by the user using the radio buttons 221 of FIG. 4. Based on the remaining data entered on in the transition display section of the dialog box, an appropriate record may be added to the transition list 111 seen in FIG. 2 as indicated at 313, 315, 317 and 319 in FIG. 7.

The flow chart seen in FIG. 8 illustrates the procedure followed to utilize the information entered in the dialog boxes shown in FIGS. 5 and 6. As described earlier, right clicking the mouse on the displayed page displays a pop-up menu which supplies the developer with the option of replacing displayed text or inserting a tag at the position in the displayed page indicated by the mouse click. If the mouse is clicked on a word or on a selected string which is not highlighted anchor text as determined at decision block 325,, the dialog box of FIG. 5 is displayed to provide the information collected in steps 327–330 of FIG. 8. Alternatively, a menu selection can also invoke the display the dialog box of FIG. 5 as indicated at 333. If the developer right clicks the mouse on displayed anchor text, an anchor image, or on whitespace, the dialog box of FIG. 6 is displayed to obtain information descriptive of a new anchor as indicated at steps 341–343 in FIG. 8.

Automated Development Session

To insure that the developer does not overlook any links which may or may not be left operative on pages presented to the kiosk user, it is advantageous to automate the task of scanning each page for links and automatically presenting those links to the developer who may then elect the treatment to be accorded each link. The automated development procedure illustrated by the flow chart of FIG. 9 provides such a mechanism.

Figure 9:
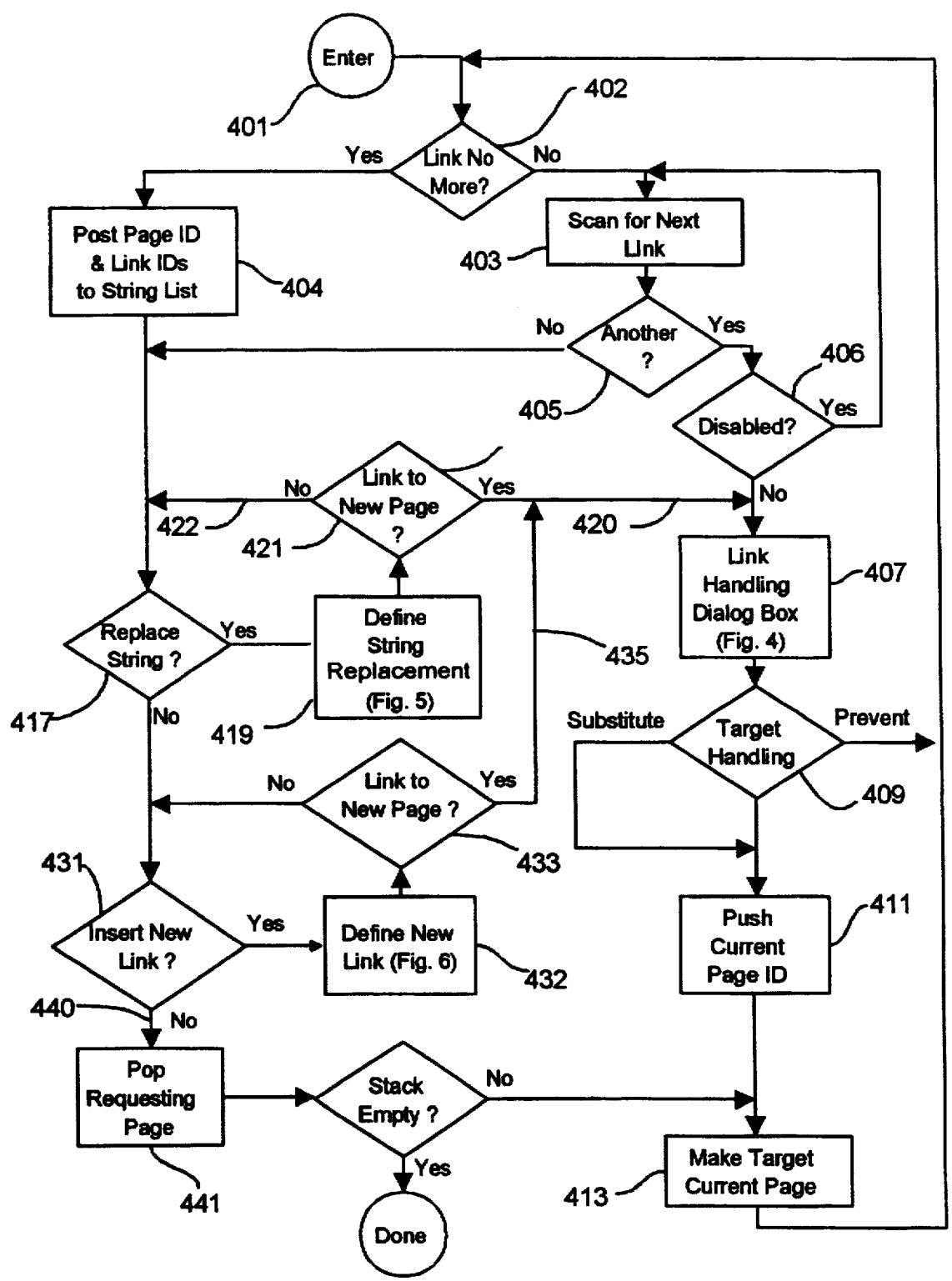
FIG. 9 is a flow chart illustrating a mechanism for automating a content development session during which the information which may be accessed by a kiosk user is defined.

The automated development session depicted in FIG. 9 begins with the display of the kiosk's "attract page" which constitutes the root page for the hierarchy of pages which are associated by hypertext links. The attract page, illustrated by the page 81 seen in FIG. 1, is advantageously stored on the kiosk computer's local hard drive during normal use. In the absence of any activity by a user of the kiosk for a predetermined timeout duration, the kiosk computer automatically restores the display of the attract page so that all users are presented with the same beginning point.

Display pages which are not linked directly or indirectly to the attract page are not accessible to the kiosk user. The set of presentation pages which will be made available to the user is defined by the combination of (1) the locally stored pages on the kiosk computer's hard drive linked to the attract page; (2) remotely stored pages linked to those locally stored pages; and (3) other remote pages to which linking is permitted from remotely stored pages by the access control information, including additional links, stored in the transition list 111 and the string list 133 seen in FIG. 2. The development session, typically carried out by a computer such as the authoring computer 30 seen in FIG. 1 which is remote from but in communication with the kiosk computer (s), accordingly consists of the steps of making available the locally stored pages, establishing a connection via the Internet (or a similar connection) to one or more remote servers which store the remotely stored pages, and evaluating those available pages and the links imbedded in each to develop the access control found in the two lists and to specify which pages accessed via the network are to be locally stored and which are to remain accessible only by a network access.

Thus, at entry point 401 seen in FIG. 9, the development session begins with the root attract page being the current page undergoing evaluation. At step 402, each page is scanned for the presence of links at 403 unless that page has been previously identified as being a page from which no more further linking is to be permitted as previously explained in connection the checkbox 214 shown in FIG. 4. If the linking is to be prohibited from all links on the current page, the page is processed at 404 by posting to the string list 133 a replacement command record having a Target_Page field set to the URL of the current page and the boolean flag bit Disable_Pagewide set to TRUE. As previously noted in connection with the string replacement command Example 6, the HTML rewrite mechanism 130 seen in FIG. 1 responds to this command by replacing each the linking tag in an HTML being accessed with the imbedded anchor information alone, thereby disabling each link and removing the highlighting or other visually linking cue which would otherwise be added by the browser to identify the presence of these links. Note that the command created at step 404 eliminates the need for the user to individually enable or disable links on a page which may contain large numbers of links.

When linking from the current page is permitted, each link is processed by the content developer as indicated at step 403-409 in FIG. 9. The current hypertext page is scanned, beginning at the start of the document, for the first (next) hypertext link to another page. If an imbedded link is found, as indicated by the "Yes" result branch at decision block 405, the link handling dialog box depicted in FIG. 4 (and the detailed flowchart of FIG. 7) is displayed for a response by the developer as seen at 407. As previously discussed, the link handling dialog box permits the developer to preview the target page specified by the detected link and to choose whether to accept (OK) the link, prevent the link from being activated, or substituting a link to a different page as indicated by decision block 409 in FIG. 9. In addition, as seen in the dialog box of FIG. 4, the content developer may specify whether a given target page is to be locally stored if currently accessed from the network, and whether further links from that page are to be disabled as a group (by checking checkbox 214 on FIG. 4) or individually processed.

If the developer elects to prevent an individual link by selecting either "Prevent Here" or "Prevent Everywhere" using the radio buttons 205, the string list 133 is updated as previously discussed in connection with step 309 seen in FIG. 7, and a return is made to the page scan step 403 to search for the next link on the current display page.

If the developer accepts the imbedded link, or substitutes a different link, the currently displayed page identification is pushed into a software stack as indicated at step 411, the newly specified target becomes the current display page as seen at step 413, and scanning of that the new current page is begun by returning to the scanning step 403.

When there are no further links to evaluate on the current page, as indicated by the No branch from decision block 405, the user is given the opportunity at step 417 to modify the displayed text using the string replacement dialog box of FIG. 5 as seen at step 419, which may be activated at step 417 either by menu request or by right clicking on a word or selected text in the displayed document as previously discussed. The replacement string specified in dialog box 5 is also evaluated at step 421 to determine if it contains a link to a hypertext page and, if so, the identified link is evaluated in the usual fashion by returning control to the dialog box of FIG. 4 as indicated by branch 420. Otherwise, the user is given the opportunity the enter further replacement strings as indicated by branch 422.

In a similar fashion, as indicated at decision block 431, the user is also given the opportunity to use a right mouse click to further edit an existing link, or add an entirely new link, by right-clicking on white space or a link anchor as indicated at 325 and 341-343 of FIG. 8 to invoke the link description dialog box of FIG. 6 as seen at step 432 of FIG. 9. If the developer elects to define a new link, as indicated by the yes branch 435 from decision block 433, control is returned to step 407 to enable the dialog box of FIG. 4 to be used to add a transition display if desired. Otherwise, the display of the current page is continued such that the developer can add or modify additional links or add additional string replacement commands.

When the user indicates that no additional editing of the current page is required, and when all remaining hypertext links on the current page have been authorized, no further processing of the current page is required as indicated at branch 440, the page which contained the link to the current page is popped from the stack to become the new current page as indicated at step 441. If the stack is empty, indicating that all links from the attract page have been resolved, the development session is concluded; otherwise, the page popped from the stack becomes the new current page as indicated at step 413 and scanning of that page resumes at step 403 which searches for the next unresolved link.

Figure 10:
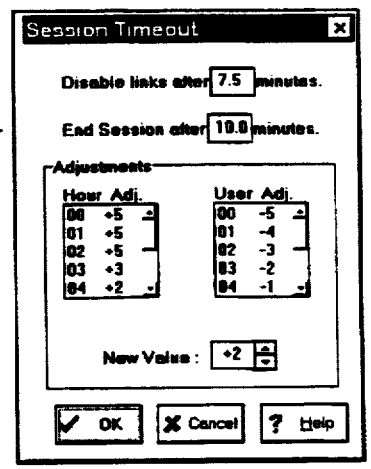
FIG. 10 shows the on-screen appearance of a dialog box used to accept information defining the manner in which the duration of an individual user session is limited based upon the character of the documents selected for viewing, the time of day, and information characterizing the particular user.
Figure 11:
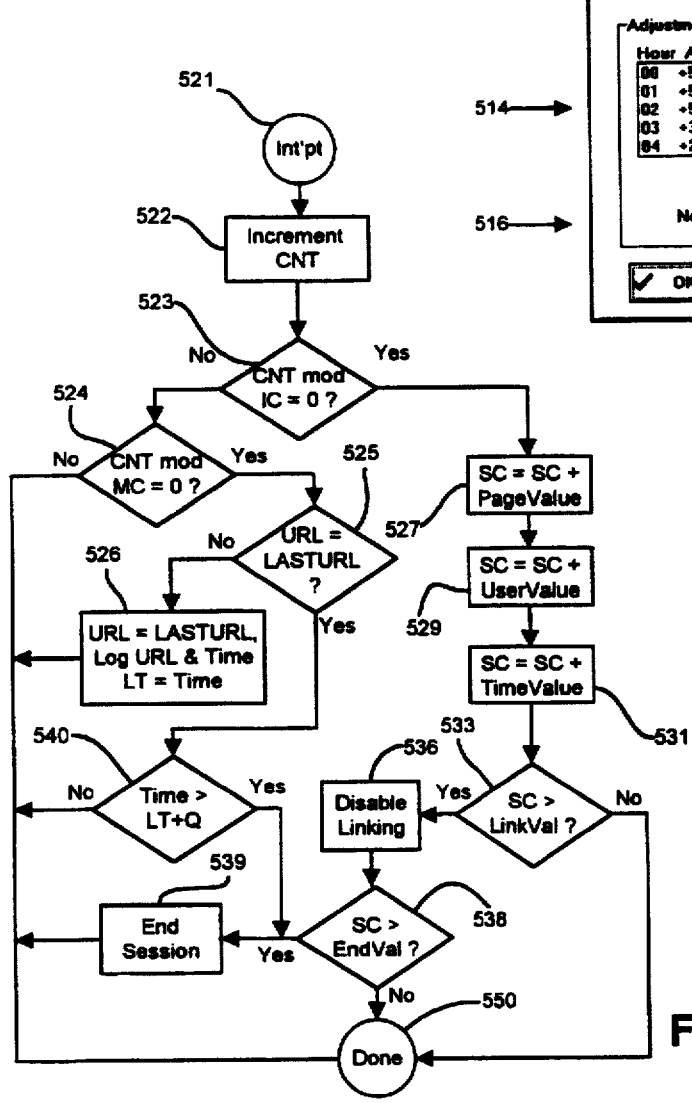
FIG. 11 is a flow chart describing a routine for limiting the duration of a given user session in response to a particular document being viewed and other information provided by the dialog box of FIG. 10 and for recording usage data.

FIG. 10 of the drawings illustrates the on-screen appearance of the dialog used to obtain information from the user which may be employed to limit the duration of a given user session while FIG. 11 is a flow chart which illustrates the manner in which this information is utilized to control the session duration. The dialog box of FIG. 10 is displayed on request by the user, or automatically the beginning or end of each development session, and includes the following controls: an edit box at 510 which accepts a numerical quantity indicating the number of minutes each session may continue before links to further pages are disabled by employing the HTML rewrite mechanism seen at 130 in FIG. 2 to rewrite all link tags as anchor information alone; and an edit box 512 which accepts a numerical quantity indicating the number of minutes each session may continue before the session is mandatorily terminated by returning the user to the home page, accomplished by utilizing the transition display mechanism 133 of FIG. 2 to issue a URL request for the home page.

Note that the URL request which forces the return to the home page may be accompanied by a predecessor transition display page which displays a warning notice, e.g., "TIME EXPIRED. NEXT USER PLEASE.". In addition, to further discourage the current user from continuing to use the display unit, the home page may require the mandatory completion of an HTML "registration" form which requests identification data from a user, such as name, mailing address, phone number, date of birth, etc. This demographic data is then recorded and may be used to produce a user evaluation number. By way of example, the evaluation number may be generated by a combination of the user's age and zip code, generating a maximum valuation number for adults living in a particular area and a minimum valuation number for children living far from the kiosk location.

As illustrated at 514 in FIG. 10, the developer uses two list boxes to develop session time adjustment profiles based on the time of day when the display unit is being displayed (left hand list box at 514) and the user valuation number produced from the demographic data as noted earlier (the right hand list box at 514). In this way, session durations greater than the default values entered at 510 and 512 are allowed at those times during the day when little usage is likely, and reduced session times during the busiest hours. Similarly, using the adjustment profile recorded in the right hand list box at 514, adjustments to the session times may be made based on the user valuation number. Changes to individual entries in either the time-of-day adjustment profile in the left list box at 512 or the user valuation profile in the right list box at 512 are made by clicking on an individual item and changing the adjustment value in the spinner-driven edit box at 516.

Session Timing and Logging Mechanism

Session timing is accomplished by an interrupt or timer driven routine as illustrated in FIG. 11. Upon each occurrence of a system time interrupt, the routine is entered at 521 and a count value CNT is incremented. If CNT is evenly divisible by a value IC (with IC having a value selected such that the routine beginning at 527 is entered every 10 seconds, for example), a session count value is incremented (or decremented) by PageValue at 527, incremented (or decremented) by UserValue at 529, and incremented or decremented by TimeValue at 531. The session count value SC is initialized to zero at the beginning of every new session and counts upward toward limit values LinkVal, which establishes a session duration threshold at which further linking is terminated, and EndVal, which establishes a session duration threshold at which the session is terminated entirely. PageValue is a positive or negative integer which adjusts the amount by which SC changes (upwardly or downwardly) based upon the value entered by the user for the current page being viewed when that page was ranked using the controls 216–218 in the dialog box seen in FIG. 4. UserValue is a positive or negative integer reflecting the weight given to the user valuation in the right hand list box 514 of FIG. 10, with the valuation number being derived from the demographic data entered during user registration as discussed above. Finally, the count SC is adjusted by TimeValue comprising the combination of a fixed positive base value which reflects the passage of time as adjusted by a time-of-day adjustment obtained by comparing the current time of day with the time-of-day profile value entered by the developer in the left hand list box 514. Together, PageValue, UserValue and TimeValue quantities provided by the developer control the rate at which SC advances toward the thresholds LinkVal and EndVal which are set by the developer's entries at 510 and 512 respectively as seen in FIG. 10.

When SC is greater than LinkVal as determined at 533, the link disabling process in HTML rewrite mechanism 130 is turned ON as indicated at 536. If the session count value SC is also larger that EndVal as determined at test 538, the session is terminated as indicated at 539.

The timer driven interrupt handling routine seen in FIG. 11 further includes a mechanism for logging session usage. Each time the interrupt count CNT is divisible by the integer MC (which is selected such that the test at 525 is performed once per second, for example), a test is performed at 525 to determine if the current page being displayed has changed since the last test at 525, a determination made by comparing the URL of the current page with the string LASTURL saved during the last detected transition. If URL is not equal to LASTURL, an entry is appended to a log file consisting of records each comprising the new URL, the time of day at which the page designated by the URL was first displayed, and an integer identifying the current user by specifying the record number for that user in a file of registration records accumulated for the user from CGI processing of the home page registration form. In this way, a log file is maintained from which the entire viewing history for each user may be reconstructed, the amount of usage for each HTML document (total occurrences and average viewing time), and data correlating the demographic data with the available content. Such data is of particular value to the content developer since it enables the developer to identify pages which were of interest to users, pages which were frequently accessed from the network and are hence candidates for local storage, etc. As noted earlier in connection with FIG. 1 of the drawings, this demographic and usage log data may be transmitted to the authoring computer by establishing a file transfer connection via a conventional modem-to-modem route over the dialup telephone lines, of by using the Internet to perform an FTP or SMTP transfer.

When the current URL is found at test 525 to be unchanged from LASTURL, a further test is performed at 540 to determine if the current time exceeds LT, a time value saved at 526 when the current URL was first detected, by more than a idle time value Q. When Time>LT+Q, it is established that the current page has been on screen for more than time Q with no user activity; consequently, since the display unit is apparently not being used, the session is ended by branching to 539 such that the attract (home) page is again displayed for viewing by the next user.

Information Exchange

Figure 12:
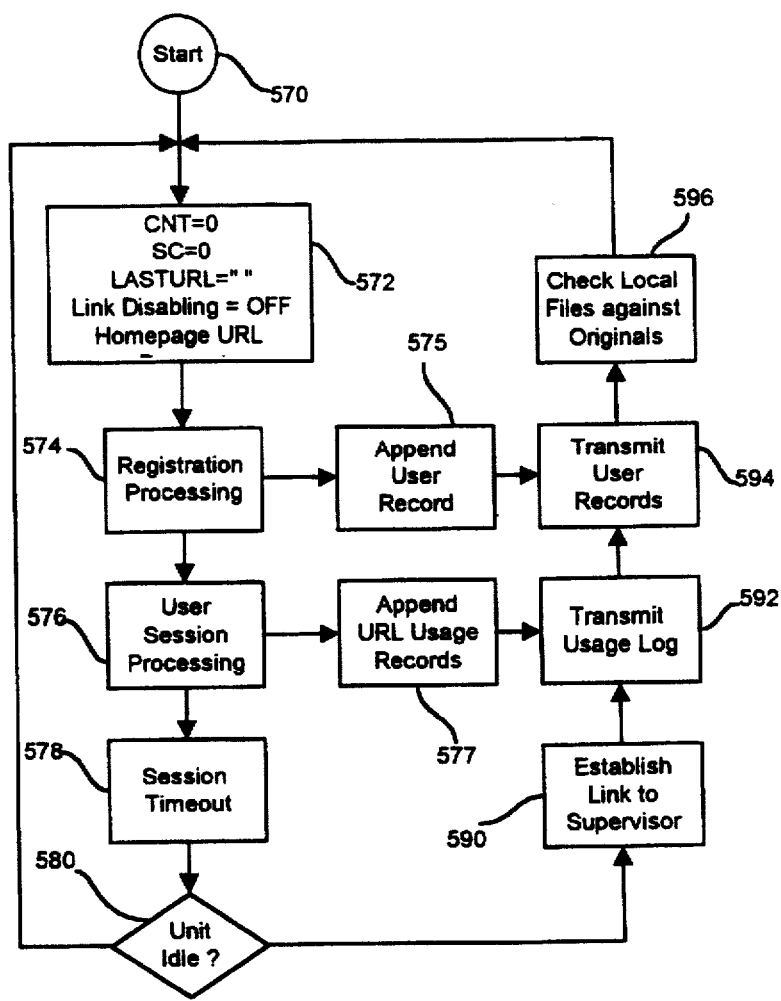
FIG. 12 is a flow chart illustrating the manner in which the display unit exchanges information with an authoring computer which provides its original content, and with a supervisory computer which receives information describing the operation of the display unit.

The sequence of events which occur during the overall operation of a display unit, such as the kiosk 10 seen in FIG. 1, is depicted by the flow chart of FIG. 12.

Before the display unit is first operated, it must receive the locally stored displayable information files as well as the control structures developed as described in connection with FIG. 9 consisting of the string list seen at 133 in FIG. 1, the transition list seen at 111 in FIG. 1, and the lookup table 112 seen if FIG. 1. As previously noted, these files are advantageously created using the interactive content authoring system described above at a remote authoring station, such as the computer 30 seen in FIG. 1, and are transferred to the display unit's local storage by a file transfer via the dialup telephone system or by Internet FTP transfers.

Each session begins, as indicated at 572, by initializing the CNT, SC, and LASTURL variables, by turning off the link disabling mechanism if it has previously been turned ON as described in connection with step 536 seen in FIG. 11, and by issuing a URL request for the display of the home (attract) page. As previously noted, the home page or its necessary successor advantageously includes a registration form which is directed to a local CGI (Common Gateway Interface) processing facility which appends a record to a file of records containing user identification information as indicated at 574 and 575 in FIG. 12.

During the course of the session, as each new page is accessed, the URL for that page, its start time, and an identifying number specifying the current user is appended to a log file of URL usage records as indicated at 576 and 577 (previously describe in connection with step 526 in FIG. 11). When the session ends by a timeout condition being detected as indicated at 578 (tests 538 and 540 in FIG. 11), if the display unit is determined to be idle at 580 (based on test 540 in FIG. 11), the display unit makes use of the idle time to perform housekeeping information transfers as indicated at 590–596 in FIG. 12. First, a link is established to a supervisory computer (typically a host computer on the Internet which can receive information using FTP or SMTP transfers) at 590 and thereafter the previously untransmitted portion of the usage record file is transmitted as indicated at 592 and the previously untransmitted user records are transmitted at 594.

Then, as indicated at 596 in FIG. 12, the records in the lookup table are processed sequentially by transmitting an "if modified since" message to the server holding each file designated by an origination URL in the lookup table. If it is determined that the file identified by the origination URL has been modified since the locally stored copy was created (perhaps by the authoring computer) or last updated by the individual display unit, the newly revised copy is accessed and stored after being passed through the HTML rewrite unit 130 which alters the newly stored local copy in accordance with the commands contained in the string list 133.

The mechanism for updating stored files which originated from remote locations is illustrated schematically in FIG. 13 of the drawings. The left hand flow chart in FIG. 13 illustrates the manner in which the lookup table, shown generally at 600, is used to redirect URL requests for remotely stored documents such that they instead retrieve locally stored copies. The right hand flow chart of FIG. 13 shows how the lookup table 600 is employed to periodically update the stored information so that it takes into account modifications to the files as they exist in the remote servers.

Both of the routines illustrated in the flow charts of FIG. 4 are executed by the transition display control mechanism seen at 113 in FIG. 2. The routines manipulate and respond to values stored in lookup table 600 which consists of a plurality of entries, one for each remote file stored in local storage, each entry consisting of four fields: an originating URL field 603, a Chck field 604 storing a time stamp indicated when the entry was last validated, a Mod field 605 storing a time stamp indicating when the corresponding local file was stored or last updated, and a local URL field 607 specifying the local storage location of the local copy of the file.

When the control unit 113 receives a URL request which specifies a remotely located file, that file may have been locally stored at the request of the content developer (using the Make Local checkbox 215 seen in FIG. 4), in which case the a copy of the file originally designated by an originating URL is placed in local storage at a location specified by a local URL in field 607.

During the operation of the display unit, when the user activates a link to generate a URL request seen at 109 in FIG. 2, the routine beginning at the entry point A at 609 is entered. If the URL contained in the request specifies a remote URL, a search is conducted to determine if the requested remote URL is in the lookup table 600, indicating that a local copy is available. To speed the search, the entries in lookup table 600 are advantageously sorted into order by originating URL, permitting a binary search for a matching entry to be conducted as indicated at 611. If a match is found, the local URL from field 607 is substituted for the URL in the request being processed as indicated at 615 to redirect that request to the local copy. The lookup routine concludes at exit point B indicated at 617 in FIG. 13.

When the display unit is idle and the routine at 596 is called as indicated in FIG. 12 to verify the integrity of the stored files against the remote originals, the routine beginning at entry point C as seen at 619 in FIG. 13 is called. Each time the routine is entered, one of the entries pointed to by a counter value FP is checked. If the entry pointed to by FP contains a time stamp in the Chck field which differs from the current time by less than W as indicated by the test 621, no further updating is needed and the routine terminates at exit point D seen at 622. The value of W specifies the frequency at which updating is performed. Thus, if W is set to a value equivalent to 30 minutes, the entries in table 600 are checked until an entry is found that was check less than 30 minutes previously.

The validation performed at 623 is performed by issuing an if-modified-since message to the server specified by the URL in the originating URL field 603 pointed to by FP, together with a specification of the time stamp found in the Mod field 605 of that entry. If the remote server responds with an indication that the original file has been modified since the time indicated by Mod, the modified version is retrieved and stored locally, as indicated at 627, and the table entry pointed to by FP is updated with the current time value in both the Mod field 605 and the Chck field 604, as well as placing the new local storage URL (if necessary) in field 607. If no updating is necessary, the Chck field 604 alone receives the current time value. So long as the display unit continues to be idle as indicated by the test at 630, the testing of the validity of the entries in table 600 can continue and FP is incremented at 629 to check the next entry. If a user has activated the unit, the checking is terminated by exiting to point D at 622. The value FP is retained so that, when the validation routine is again entered at 619, checking will continue with the oldest unchecked entry.

Note that, as an alternative to performing the validation routine at the display unit as indicated at 596 in FIG. 12, a supervisory computer may be used to periodically verify the integrity of the local files stored in the individual satellite display units by performing the validation routine at intervals to identify files to be updated. When such testing reveals that a locally stored file should be updated, the supervisory computer may retrieve the modified file from the remote server and then transfer that file to each satellite display unit when that unit establishes contact with the supervisor; that is, instead of performing its own validation at 596, the satellite instead accepts the transfer of identified update files from the supervisor, eliminating the need for the individual display units to independently test their local files against the originals, and further eliminating the need for the satellite computers to maintain the Chck and Mod fields in the lookup table 600, these fields being maintained solely by the supervisory computer which performs the routine shown at the right in FIG. 13.

It is to be understood that the specific embodiment of the invention which has been described above is merely illustrative of one application of the principles of the invention. Numerous modifications may be made to the apparatus and methods described without departing from the true spirit and scope of the invention.

What is claimed is:

1. Apparatus for interactively developing a hypertext information display system comprising, in combination:

retrieval means for accessing a plurality of hypertext records, each of said records containing displayable information and at least some of said records containing one or more links to enable said retrieval means to access others of said records, output means for displaying a selected one of said records for review by a user, means for responding to activation by said user of a particular link contained in said displayed record by accepting from said user an action value indicating the nature of an action to be performed when said particular link is activated during the operation of said information display system, and means for storing a control item consisting of data identifying said particular link and said action value for said particular link.

2. Apparatus as set forth in claim 1 wherein said apparatus further comprises:

means for accepting from said user the identification of a unit of displayable information displayed in said displayed record, means for accepting from said user the identification of external information to be inserted into said displayed record at a location dependent upon the location of said unit of displayable information when said displayed record is accessed for display by said information display system, and means for storing a further control item consisting of said identification of said unit of displayable information and said identification of said external information for use in inserting said external information when said displayed record is accessed for display by said information display system.

3. Apparatus as set forth in claim 1 further comprising means for establishing a default value for said action value, wherein said means for accepting from said user an action value comprises means for accepting from said user deviations from said default value.

4. Apparatus as set forth in claim 1 wherein said action code indicates whether said particular link is enabled or disabled.

5. Apparatus as set forth in claim 1 wherein said action code identifies a record to be retrieved when said particular link is activated during the operation of said hypertext information display system.

6. Apparatus as set forth in claim 1 wherein said particular link contained in said selected record comprises a string of characters which include a record locator string and wherein data identifying said particular link as stored with said control item comprises at least a portion of said string of characters.

7. Apparatus as set forth in claim 6 wherein said particular link contained in said selected record comprises a string of characters which includes a record locator string and wherein data identifying said particular link as stored with said control item comprises at least a portion of said record locator string.

8. Apparatus as set forth in claim 1 wherein:

the action value further indicates that the action is to be performed only when said link is activated in connection with the display of said displayed record by said information display system.

9. Apparatus as set forth in claim 1 wherein:

when the information display system accesses a hypertext record that contains the particular link, the control item is used to insert information into the hypertext record that causes the action to be performed.

10. Apparatus as set forth in claim 9 wherein:

the information is inserted by rewriting the activated link.

11. Apparatus for interactively developing a hypertext information display system comprising, in combination:

retrieval means for accessing a plurality of hypertext records, each of said records containing displayable information and at least some of said records containing one or more links to enable said retrieval means to access others of said records, output means for displaying a selected one of said records for review by a user, means for responding to activation by said user of a particular link contained in said displayed record by accepting from said user an action value indicating the nature of an action to be performed when said particular link is activated during the operation of said information display system, means responsive to acceptance of said action value for storing a first control item consisting of data identifying said particular link and said action value for said particular link, means for accepting from said user the identification of a unit of displayable information displayed in said displayed record, means for accepting from said user the identification of external information to be inserted into said displayed record at a location dependent upon the location of said unit of displayable information when said displayed record is accessed for display by said information display system, and means for storing a second control item consisting of said identification of said unit of displayable information and said identification of said external information for use in inserting said external information when said displayed record is accessed for display by said information display system.

12. Apparatus as set forth in claim 11 further comprising means for establishing a default value for said action value, wherein said means for accepting from said user an action value comprises means for accepting from said user deviations from said default value.

13. Apparatus as set forth in claim 11 wherein said action code indicates whether said particular link is enabled or disabled.

14. Apparatus as set forth in claim 11 wherein said action code identifies a record to be retrieved when said particular link is activated during the operation of said hypertext information display system.

15. Apparatus as set forth in claim 11 wherein said particular link contained in said selected record comprises a string of characters which include a record locator string and wherein data identifying said particular link as stored with said control item comprises at least a portion of said string of characters.

16. Apparatus as set forth in claim 15 wherein said particular link contained in said selected record comprises a string of characters which includes a record locator string and wherein data identifying said particular link as stored with said control item comprises at least a portion of said string of characters.

17. Apparatus as set forth in claim 15 wherein said particular link contained in said selected record comprises a string of characters which includes a record locator string and wherein data identifying said particular link as stored with said control item comprises at least a portion of said record locator string.

18. Apparatus for interactively developing a hypertext information display system comprising, in combination:

retrieval means for accessing a plurality of hypertext records, each of said records containing displayable information and at least some of said records containing one or more links identifying others of said records, output means for displaying a selected one of said records for review by a user, means for searching said displayed record for links contained in said displayed record, means responsive to the detection of a particular link in said displayed record for issuing a request to a user for the entry of an action value indicating the nature of an action to be performed when said particular link is activated during the operation of said information display system, means for accepting said action value from said user, and means for storing a control item consisting of data identifying said particular link and said action value for said particular link for use when one of said hypertext records containing said particular link is accessed for display by said information display system.

19. Apparatus as set forth in claim 18 further comprising means for establishing a default value for said action value, wherein said means for accepting from said user an action value comprises means for accepting from said user deviations from said default value.

20. Apparatus as set forth in claim 18 wherein said action code indicates whether said particular link is enabled or disabled.

21. Apparatus as set forth in claim 18 wherein said action code identifies a further record to be retrieved when said particular link is activated during the operation of said hypertext information display system.

22. Apparatus as set forth in claim 21 further comprising means response to the reciept of an action code identifying a further record to be retrieved when said particular link is activated for displaying said further record for review by said user.

23. Apparatus as set forth in claim 18 wherein said particular link contained in said selected record comprises a string of characters which includes a record locator string and wherein data identifying said particular link as stored with said control item comprises at least a portion of said string of characters.

24. Apparatus as set forth in claim 23 wherein said particular link contained in said selected record comprises a string of characters which includes a record locator string and wherein data identifying said particular link as stored with said control item comprises at least a portion of said string of characters.

25. Apparatus as set forth in claim 23 wherein said particular link contained in said selected record comprises a string of characters which includes a record locator string and wherein data identifying said particular link as stored with said control item comprises at least a portion of said record locator string.

26. Apparatus for interactively developing a hypertext information display system comprising, in combination:

retrieval means for accessing a plurality of hypertext records, each of said records containing displayable information and at least some of said records containing one or more links to enable said retrieval means to access others of said records, output means for displaying a selected one of said records for review by a user, means for responding to activation by said user of a particular link contained in said displayed record by accepting from said user an action value indicating the nature of an action to be performed when said particular link is activated during the operation of said information display system, means responsive to said action value for storing a control item consisting of data identifying said particular link and said action value for said particular link, said action value being used to rewrite said particular link when a record containing said particular link is accessed for display by said information display system.

27. Apparatus as set forth in claim 26 wherein:

the action value further indicates that the action is to be performed only when said link is activated in connection with the display of said displayed record by said information display system.

28. Apparatus as set forth in claim 26 wherein said apparatus further comprises:

means for accepting from said user the identification of a unit of displayable information displayed in said displayed record, means for accepting from said user the identification of external information to be inserted into said displayed record at a location dependent upon the location of said unit of displayable information when said displayed record is accessed for display by said information display system, and means for storing a further control item consisting of said identification of said unit of displayable information and said identification of said external information for use in inserting said external information when said displayed record is accessed for display by said information display system.

* * * * *